No. 813,182. PATENTED FEB. 20, 1906.
G. F. SWORTFIGER.
COMBINED ANCHOR HOOK, GUY CLAMP, AND GUY STRETCHER.
APPLICATION FILED AUG. 1, 1905.
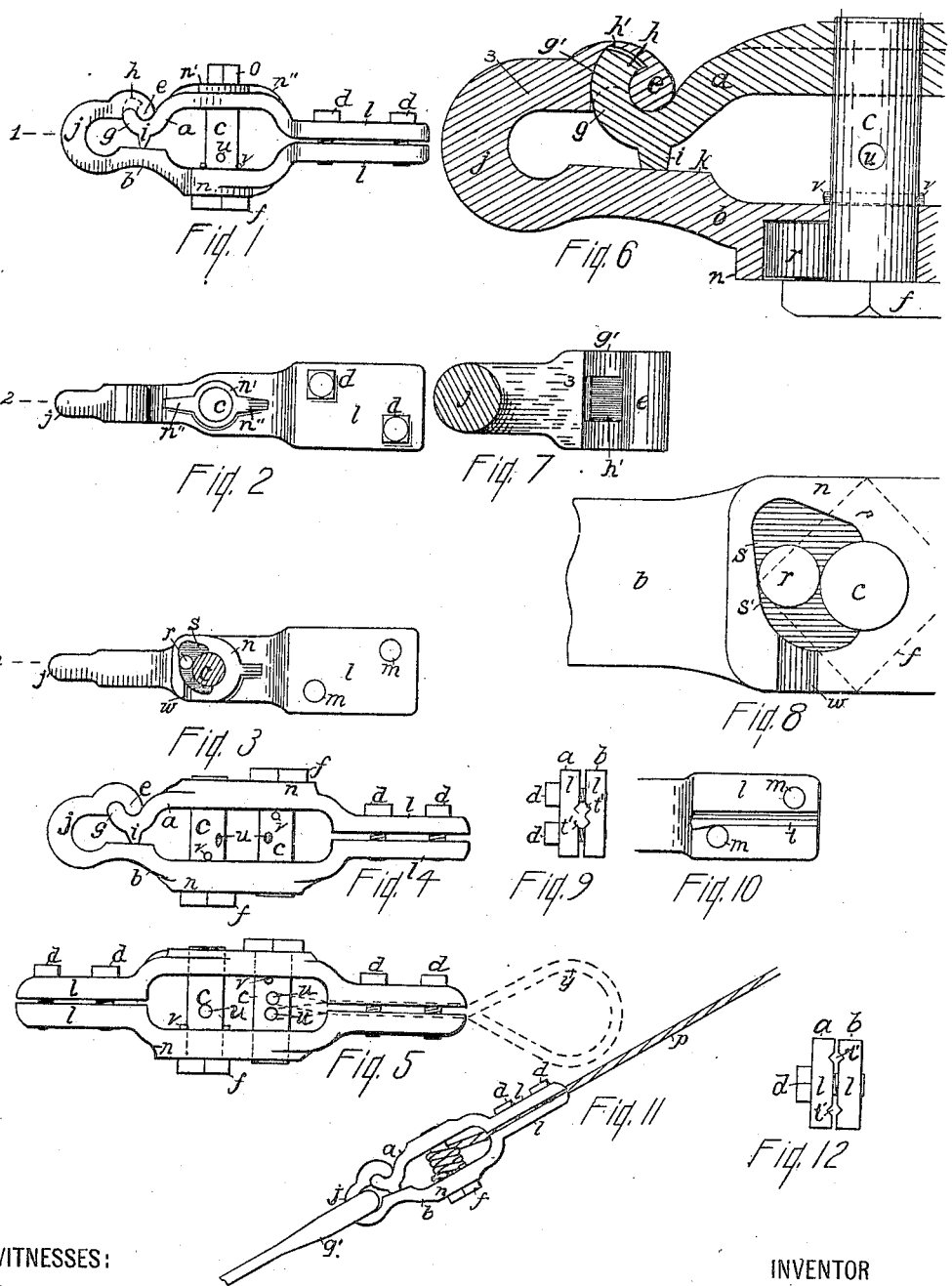
WITNESSES:
INVENTOR
BY
ATTORNEY

UNITED STATES PATENT OFFICE.

GEORGE F. SWORTFIGER, OF NEWARK, NEW JERSEY.

COMBINED ANCHOR-HOOK, GUY-CLAMP, AND GUY-STRETCHER.

No. 813,182.     Specification of Letters Patent.     Patented Feb. 20, 1906.

Application filed August 1, 1905. Serial No. 272,211.

*To all whom it may concern:*

Be it known that I, GEORGE F. SWORTFIGER, a citizen of the United States, and a resident of Newark, in the county of Essex and State of New Jersey, have invented a certain new and useful Combined Anchor-Hook, Guy-Clamp, and Guy-Stretcher, of which the following is a specification.

This invention relates to the stretching and securing of guys, and has for its objects the combination in compact form of means for connecting a guy with an anchorage, of stretching the guy to any desired tension without the employment of a "block and fall," and for permanently securing the guy from becoming loosened from the device. These objects are attained by the means set forth in this specification and the accompanying drawings, in which like letters refer to similar parts throughout the several views.

Figure 1 is a side view of the combined anchor-hook, guy-clamp, and guy-stretcher. Fig. 2 is a side view showing the top of Fig. 1, and Fig. 3 is a view of what would be the under side of Fig. 1. Fig. 4 is an edge view of the device adapted for holding two guys. Fig. 5 represents the stretching means with a clamp at both ends. Fig. 6 is an enlarged detail showing how the two parts of the device are hooked together at one end. Fig. 7 represents the inside of the hook 3 *e* of Fig. 6, taken through line 1, Fig. 1. Fig 8 is an enlarged representation of the locking means applied to the guy-stretching spindle. Fig. 9 is an end view of the clamping end of the device, showing a double groove for two guys. Fig. 10 shows the inside face of one of the clamps with a single guy-wire groove. Fig. 11 represents the combined device in use. Fig. 12 shows the end of a clamp with the guy-wire grooves near the edges of the clamp with the fastening-bolts in the center.

The device, as shown in Fig. 1, consists of two plates *a b*, broadened at the ends *l* to form clamps for holding the guy, bolts *d d* serving to draw and secure them together. The other end of plate *b* is formed into an eye for connecting with a hook or an eyebolt. The corresponding end of plate *a* is adapted to interlock with the plate *b*. The central parts of the plates are separated and are adapted to receive a spindle or drum *c* through them that constitutes the guy-stretcher. The two plates may be readily separated when the bolts are removed from the clamping end. The eye end of the plate *b* consists of the loop *j*, that is extended into the parts 3 *e*. (See Fig. 6.) A circular notch *g'* is formed back of the rounded terminal *e*, and, as will be seen in Fig. 7, a recess *h'* is made in the notch *g'*. The hook end of the plate *a* (see Fig. 1) is provided with a rounded end *g*, that just fits in the notch *g'* of the plate *b*, and a projection *h* on the end *g*, Figs. 6 and 1, snugly fits into the recess *h'*. These parts are made to join closely, and when the clamp ends of the plates are drawn together the lug *i*, Figs. 1, 4, 6, secures the hooked parts from displacement. The hooks *g n e* will prevent the longitudinal separation of the plates, and the projection *h* will prevent any sidewise separation. A plain surface *k* is provided as a fitting-surface to facilitate a proper adjustment together of the several hooking parts. The plates separate readily when the bolts *d d* are removed. A spindle *c* is passed through the central open portions of the two plates, as in all the figures, except 7, 9, 10, 12. These plates are made without unnecessary weight of metal, so that on the plate *a* a flange *n'* is provided around the hole for the spindle, and the flange is extended into ribs *n'' n''* for stiffening that part of the plate. (See Fig. 2.) The bearing for the spindle is similarly extended on the plate *b* for strength and also to afford a chamber *s* for the locking-roller *r*. (See particularly Figs. 3, 6, 8.) This locking device is one commonly employed, using either a ball or a roller as *r* is here used. The head of the bolt *c* is represented by the broken lines *f*, Fig. 8, showing that the bolt-head sufficiently covers the chamber to prevent the escape of the roller. The upper part of the chamber contains ample room for the free play of the roller when the spindle *c* is turned in the direction of the arrow. When in the position shown, the roller drops between the spindle and the inclined plane *s'* behind the roller and prevents the reverse movement of the spindle. A channel *w* is provided as an outlet from the chamber for the insertion of an instrument to hold the roller from contact with the spindle in case of requirement.

The spindle *c* is held in place by a pin *v* through it inside of the plate next to the spindle-head. A hole *u* is made in the spindle for the insertion of the end of the guy.

The end of the spindle opposite the head may be extended beyond the plate and squared, as at o, Fig. 1, so that wrenches may be applied to each end of the spindle when extra tension on a guy is required.

Fig. 2 represents the application of the combination device, q' representing an anchor-bolt terminating in an eye, to which the device is attached by the hook j. A guy-wire p passes through the clamps l and is wound on the spindle c. When the necessary tightness is secured, it is firmly held by the wedging-roller next the spindle, and additional security is obtained by the tightening of the clamps.

In Fig. 4 the device is elongated to contain two of the spindles c, the heads of the spindles being placed on opposite plates to facilitate the use on them of a wrench. This will take two guys or a loop, as y, Fig. 5. For this purpose two grooves will be required in the clamps. The two grooves may lie between the bolts, as shown in the end view of the clamps in Fig. 9, or the bolts may be placed in the center of the clamps with the grooves near the edges of the clamps, as in Fig. 12.

Fig. 5 illustrates the stretching feature of the device provided with a clamp at each end. This may be used for splicing a guy or it may take a guy at one end and a loop at the other, as represented by the broken lines y. This may constitute a wire loop around a pole, post, or tree as a substitute for an anchor-rod.

The employment of this combined guy hook, clamp, and stretcher is a saver of time, in that it obviates the necessity for carrying and handling a block and fall and saves guy material, since less of it will be required for making a connection with the drum c than for the usual double looping through clamps. There is an additional advantage in having an attachment in which by means of an ordinary wrench any accruing slackness in the guy may be quickly taken up with a common wrench.

In making these combined guy hooks, clamps, and stretchers in different sizes and for varied uses it may be desirable to alter the forms from those shown herein.

Having described my invention, what I claim, and desire to secure by Letters Patent, is—

1. The combination in a single device of means for attachment to an eyebolt, means for clamping the guy-wire, and means between the two and united therewith for winding in the end of the guy and securing it against unwinding when wound, comprising a drum to which the guy is attached, a head on the drum for the application of a wrench, a chamber in one of the plates contiguous to one of the bearings of the drum, and a roller in the chamber having contact on one side with a bearing of the drum and on its other side with an inclined part of the chamber.

2. A combination guy hook, stretcher and clamp comprising two plates adapted to interlock at one end and constituting a hook, the other ends forming a clamp secured together by bolts, the intermediate portions forming an open loop with a winding-drum therein for holding and winding in the guy through the clamps.

3. A combination guy hook, stretcher and clamp comprising two plates, one end of the plates forming a clamp to be united by bolts, the other ends of the plates interlocking and embodying a hook, the intermediate parts of the plates forming a loop with a winding-drum therein for holding and winding in the guy through the clamps, and locking means to prevent a reverse movement of the drum.

4. A combination guy lock, stretcher and clamp comprising two plates forming a clamp at one end, a loop for a guy-winding drum in the middle, and interlocking hooks for joining the plates and an anchor-hook at the other end, a guy-winding drum through the two plates, a chamber for a friction-roller on one side of one of the drum-bearings, a friction-roller in said chamber, the head on the drum serving as a surface closure of the chamber.

5. A combination guy hook, stretcher and clamp comprising two plates, the two plates forming a clamp at one end to be secured by bolts, a loop for and a guy-winding drum in the middle, with means for interlocking the plates at the other end comprising a hook on one of the plates extended into a hook with a transversely-rounded end to fit a curve in the second plate, a rounded notch back of said end to receive the correspondingly-rounded end of the second plate, and a recess at the base of said rounded notch to receive the curved projection on the end of the second plate, and a bearing-point on the second plate to retain these interlocking parts together when the clamp ends of the plates are brought together.

6. In a combined guy hook, stretcher and clamp the combination with the anchor-hook and guy-clamp of a winding-drum having bearings in the combined plates, a head or heads on the drum adapted for the use of a wrench, a hole through the drum in which to secure the guy, a chamber contiguous to one of the bearings of the drum to contain a friction-roller, and a friction-roller in said chamber adapted to engage with the bearing of the drum.

7. In a combined guy hook, stretcher and clamp the combination with the anchor-hook and guy-clamp of a winding-drum having bearings in the combined plates, a head or heads on the drum adapted for the use of a wrench, a hole through the drum in which to secure the guy, a chamber contiguous to one of the bearings of the drum to contain a friction-roller, a friction-roller in said chamber and the head of the drum adapted to cover the chamber.

8. In a combined guy hook, stretcher and clamp, as shown, the combination with the guy-winding drum of a chamber contiguous to one of the bearings of the drum to contain a friction-roller, a roller in said chamber adapted to engage with and clamp the drum-bearing, and a channel to the said chamber to give access to the roller.

9. In a combined guy hook, stretcher and clamp having multiple guy-winding drums, one of the drums provided with multiple holes for the ends of guy-strands, and multiple grooves in the clamp for securing a loop in the manner shown.

10. In a combined anchor-hook guy stretcher and clamp as shown, the combination with the guy-winding drum of one of the bearings in the plates for the drum expanded into a chamber and a roller in said chamber to engage with the drum on one of its sides and with an inclined surface on its other side.

Signed at the city of Newark, in the county of Essex and State of New Jersey, this 17th day of July, A. D. 1905.

GEORGE F. SWORTFIGER.

Witnesses:
ROSALIE KAPLAN,
ARTHUR S. DE VOE.